United States Patent Office 3,282,547
Patented Nov. 1, 1966

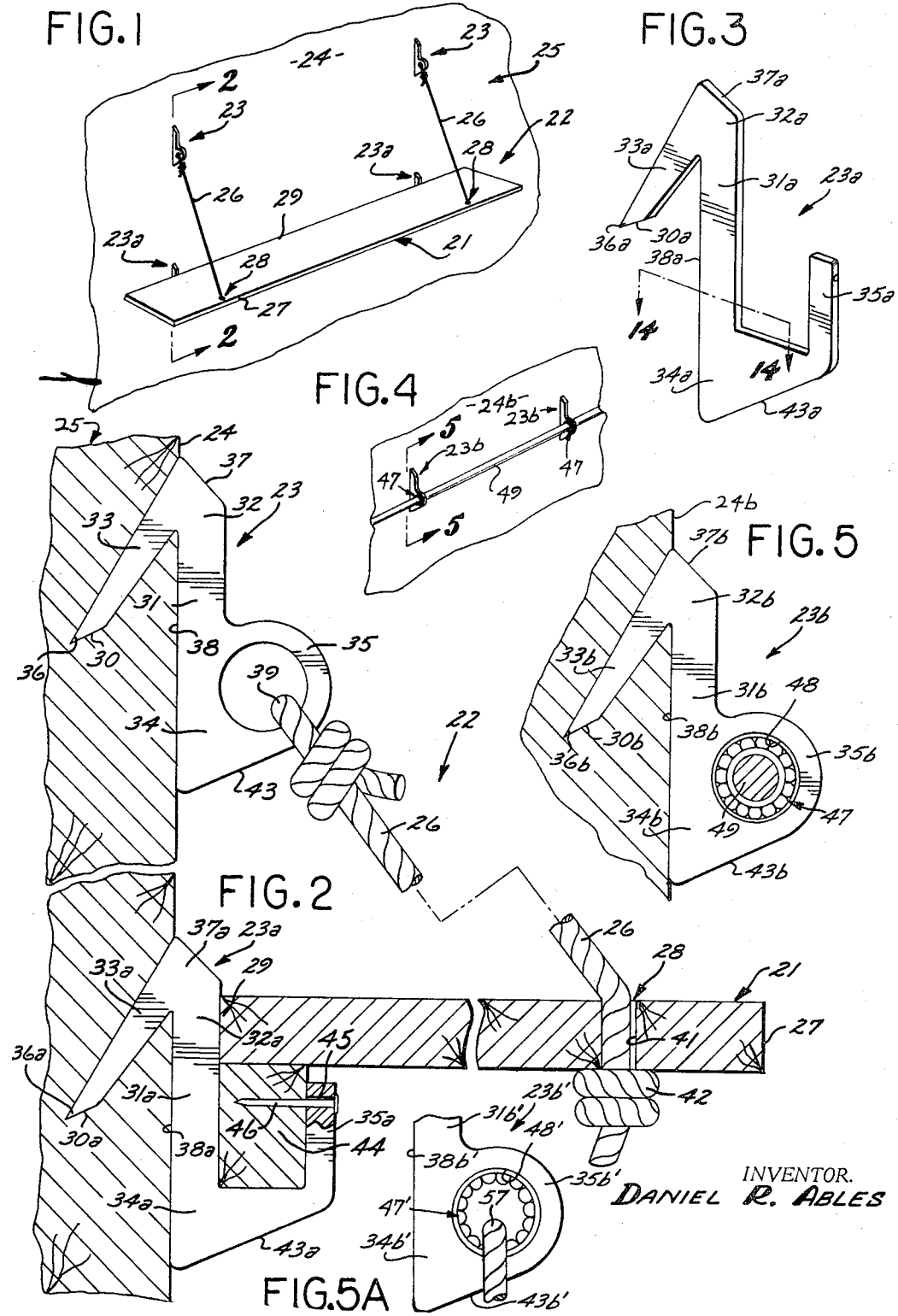

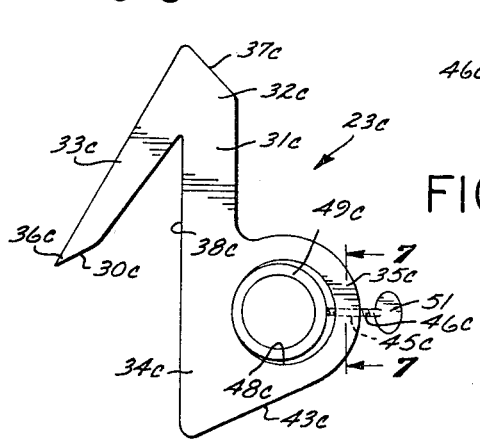
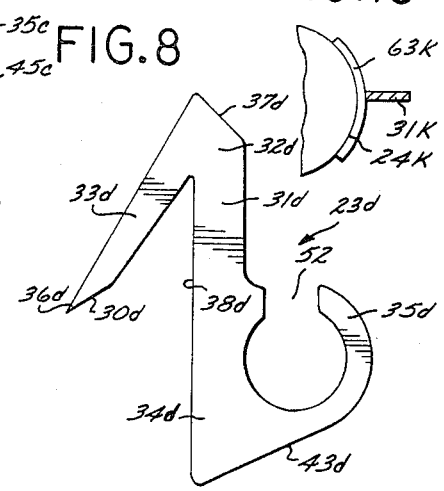
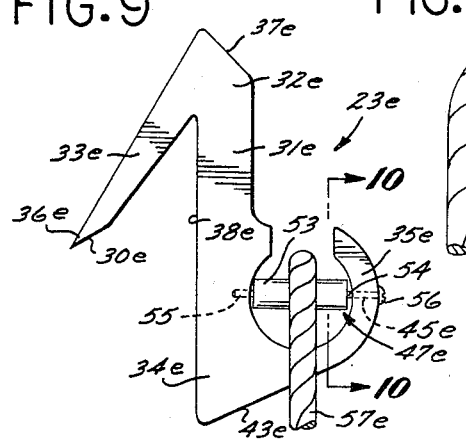
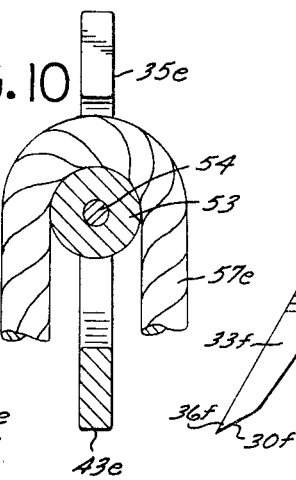
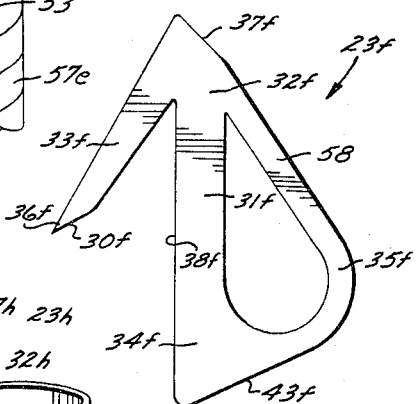
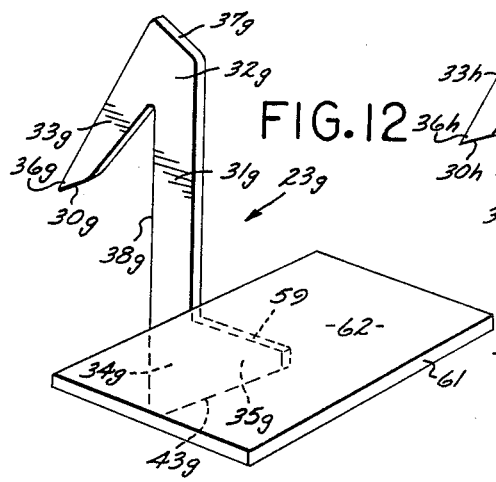
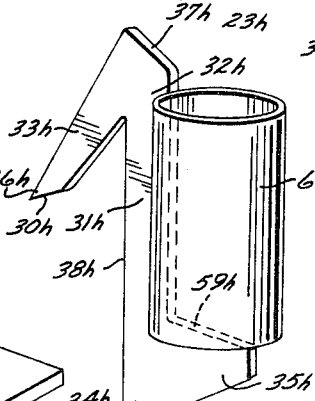

3,282,547
SUPPORTING HOOK STRUCTURE
Daniel R. Ables, 2000 Dufour Ave.,
Redondo Beach, Calif.
Filed May 6, 1965, Ser. No. 453,733
16 Claims. (Cl. 248—217)

Generally speaking, the present invention relates to a supporting hook structure and, more particularly, to a supporting hook structure which is adapted to be driven into mounted relationship with respect to a penetrable auxiliary member for firmly mounting said supporting hook structure and which is adapted to be driven out of engagement with said penetrable auxiliary member when the supporting hook structure is to be dismounted.

The penetrable auxiliary member referred to above is usually a substantially vertically directed penetrable auxiliary member or at least normally has a substantially vertical side surface thereof which is adapted to receive and mount the supporting hook structure of the present invention. It may comprise a tree trunk, a tree branch, an outside or inside wall of a building, or other structure, or a great variety of other upstanding auxiliary members capable of receiving and mounting the novel supporting hook structure of the present invention.

Also, it should be noted that while, in most exemplary applications of the invention referred to hereinafter, the engageable surface of said penetrable auxiliary member adapted to effectively mount the supporting hook structure of the present invention is normally a substantially vertical side surface of said auxiliary mounting member, the invention is not specifically so limited and the orientation of the penetrable auxiliary mounting member and of the engageable surface thereof may be modified substantially within the broad spirit and scope of the present invention, and the detailed exemplary descriptions of various forms of the invention referred to hereinafter as being mountable upon such a substantially vertically directed side wall of such a penetrable auxiliary mounting member are not to be construed as specifically limiting the invention to a vertical orientation thereof, but are to be understood as being exemplary only and as including and comprehending various other orientations of said penetrable auxiliary mounting member and the engageable surface thereof. Therefore, the description which follows hereinafter is to be read and construed broadly in the light of the statements made above.

Generally speaking, the present invention may be said to comprise an interconnecting tensile shank member provided at one end (usually an upper end) with a first coupling member and provided at an opposite end (usually a lower end) with a second coupling member, with said first coupling member being adapted to be effectively coupled with respect to an engageable surface of an auxiliary mounting member in a manner such as to be effectively and firmly supported thereby and with said second coupling member being adapted to be effectively coupled with respect to an object which is to be carried in an effective supporting and carrying relationship with respect thereto.

In one preferred exemplary form of the invention, said first coupling member comprises an angularly downwardly and outwardly directed penetrating mounting barb member having a penetrating point at the end thereof, and with the upper or first end of said tensile shank member and the effective rear end of said penetrating barb member being effectively provided with an impact-receiveing penetration anvil means angularly outwardly, downwardly, and rearwardly inclined with respect to said tensile shank member and in substantially transverse relationship to the longitudinal direction of said penetrating barb member and adapted to receive impact blows from an impact driving tool of substantial mass for causing penetration of said penetrating mounting barb member into the substantially vertical engageable side surface of said auxiliary mounting member. In this preferred exemplary form of the invention, the lower second end of said tensile shank member is effectively provided with an impact-receiving removing anvil means angularly, outwardly, upwardly, and rearwardly inclined with respect to said tensile shank member and adapted to receive impact blows from an impact driving tool of substantial mass for causing ejection and removal of said penetrating mounting barb member from said substantially vertical, side, engageable surface of said auxiliary mounting member while moving substantially vertically along said vertical, side, engageable surface thereof.

In connection with the above general description, it should be noted that the lower or second coupling member may assume a variety of different types and configurations adaptable for supporting and carrying relationship with respect to a variety of different objects which are to be carried and having various different specific advantages based upon the differences in structure thereof; at least certain of said difference forms of said lower or second coupling members being detailed hereinafter for exemplary but non-specifically limiting purposes.

Also in connection with the above generic description of the invention, it should be clearly noted that the hereinbefore-mentioned comments with respect to the word "vertical" and the specifically described "vertical" orientation of the auxiliary supporting member, the side engageable surface thereof, and the corresponding orientation of the supporting hook structure of the present invention are not to be construed as specifically limiting the invention to the vertical orientation thereof referred to in the above generic description, but shall be broadly construed as applicable to various different types of orientation other than vertical, in addition to the vertical orientation specifically referred to above and hereinafter.

With the above points in mind, it is an object of the present invention to provide a novel supporting hook structure which may be driven into firmly mounted engagement with respect to a great variety of different types of auxiliary mounting members and in virtually any desired position or orientation with respect thereto, and which may then be effectively coupled with respect to an object which is to be carried and which may also be of any of a great variety of different types. The supporting hook structure may be used individually or may be used in groups of two or more, such as when carrying a scaffold or the like for providing effective firm, rigid support for a great variety of different types of objects or structures and doing so in a manner which facilitates the quick and easy installation of the supporting hook structure means of the present invention (either one or more thereof), and any such object, objects, or additional structures supported thereby.

It is a further object of the present invention to provide a supporting hook structure of the character referred to herein which is adaptable for a great variety of different types of supporting cooperation as an effective interconnection means between a variety of different types of auxiliary mounting members and a variety of different types of objects which are to be supported and/or carried and which has the advantages referred to herein, and/or the features referred to herein, generically and/or specifically, and individually or in combination, and which is of extremely simple, inexpensive, easy-to-use construction adapted for ready mass manufacture at very low cost whereby to be conducive to widespread use thereof.

Further objects are implicit in the detailed description which follows hereinafter (which is to be considered as exemplary of, but not specifically limiting, the present invention), and said objects will be apparent to persons skilled in the art after a careful study of the detailed description which follows hereinafter.

For the purpose of clarifying the nature of the present invention, several exemplary embodiments of the invention are illustrated in the hereinbelow-described figures of accompanying two sheets of drawings and are described in detail hereinafter.

FIG. 1 is a greatly reduced-size, exterior, three-dimensional, pictorial view illustrating two different exemplary forms of the supporting hook structure of the present invention in operative effective interconnecting and coupling relationship with respect to a scaffold-type or shelf-type transverse plank member whereby to firmly and rigidly support same at a selected location in a horizontal plane extending outwardly from a vertical, side, engageable surface of a penetrable auxiliary mounting member. The two upper supporting structures illustrated in FIG. 1 exemplify one form of the invention, while the two lower supporting hook structures of FIG. 1 (which can only be seen in part in FIG. 1) exemplify a slightly modified or different form of the supporting hook structure of the present invention.

FIG. 2 is an enlarged, fragmentary, partially broken away view, taken substantially along the plane indicated by the arrows 2—2 of FIG. 1 and shows the horizontal plank member and a portion of the vertical penetrable auxiliary mounting member, comprising the vertical wall, in fragmentary, partially broken away cross-section. However, the two vertically aligned upper and lower supporting hook structures shown at the left side of FIG. 1 are shown in substantially full elevation in FIG. 2 with the exception of a fragmentary portion of the lower supporting hook structure which is shown in a vertical central plane section in order to clearly show the mounting therein of a supplementary locking means comprising a nail which is driven into a bottom forward edge downward projection member rigidly carried by the transverse horizontal plank member.

FIG. 3 is a three-dimensional, pictorial view, illustrative of each of the two lower supporting hook structures of FIG. 1, or the single lower supporting hook structure of FIG. 2.

FIG. 4 is another reduced-size fragmentary, three dimensional, pictorial view quite similar to FIG. 1, but illustrates the same type of supporting hook structure as the two upper ones shown in FIG. 1, further provided with an additional friction-minimizing means comprising a bearing means mounted within the lower carrying member, in each of the two laterally aligned similar supporting hook structures whereby to effectively rotatably support a transverse rod member, or the like.

FIG. 5 is an enlarged, fragmentary view of the same general type as previously described in FIG. 2, but is taken substantially along the plane 5—5 of FIG. 4 and illustrates the arrangement of FIG. 4 wherein the supporting hook structure carries the friction-minimizing bearing means, and the rotatably mounted rod means carried thereby.

FIG. 5A is a fragmentary view similar to just a portion of FIG. 5 with a very slight modification of the friction-minimizing bearing insert means for cooperation with a through-passing rope.

FIG. 6 is an elevational view very similar to the showing of the upper portion of FIG. 2 or the showing of FIG. 5, in that it illustrates the same type of supporting hook structure, but is shown in a very slight modification thereof wherein it is provided with a threaded type of supplementary locking means comprising a locking screw particularly suited for locking a round pipe, conduit, or rod member when inserted through the hole in the lower carrying member in a manner quite similar to the showing of FIG. 4, although obviously in a non-rotatable manner.

FIG. 7 is an enlarged, fragmentary view taken substantially along the plane 7—7 of FIG. 6 with the major portions of the supporting hook structure behind the plane of the section being broken away for purposes of simplicity and drawing space conservation reasons.

FIG. 8 is a view similar to FIG. 6, but illustrates a very slight modification of the supporting hook structure.

FIG. 9 is a view very similar to FIG. 8, but illustrates a further very slight modification of the supporting hook structure means wherein the lower carrying member is provided with a different type of friction-minimizing means, effectively comprising pulley means.

FIG. 10 is a greatly enlarged view, taken substantially along the plane indicated by the arrows 10—10 of FIG. 9.

FIG. 11 is a view similar to FIG. 8, but illustrates a further slight modification of the supporting hook structure which is adapted to carry maximum loads by having an angular outer strengthening member interconnecting the carrying member and the upper end of the tensile shank member.

FIG. 12 is an exterior, three-dimensional, pictorial view, illustrating a further slight modification of the form of the invention illustrated in FIG. 8 wherein the lower carrying member is further modified to comprise a horizontal, outwardly directed lip or edge adapted to receive and engage the horizontal bottom surface of a flat horizontal member.

FIG. 13 is another exterior, pictorial, three-dimensional view, illustrating a modification of the form of the invention illustrated in FIG. 12, which has a tubular socket type carrying member adapted to receive the lower end of a cylindrical rod, tube, or pole member, such as a flagpole, for example, although not specifically so limited.

FIG. 14 is a fragmentary view of a slight modification of the form of the invention illustrated in FIG. 3 in a fragmentary sectional view thereof, similar to that designated by the arrows 14—14 of FIG. 3, although it should be clearly understood that FIG. 14 is not the indicated sectional view of the FIG. 3 form of the invention but of a slight modification thereof, having auxiliary stabilizing means adapted to engage a substantially flat, vertical, side, engageable surface whereby to positively stabilize the complete supporting hook structure against any tendency toward lateral pivotal movement relative to said vertical, side, engageable surface.

FIG. 15 is a fragmentary sectional view generally similar to FIG. 14 but illustrating a slight modification of the stabilizing means wherein it is primarily intended to engage an exteriorly curved or convex engageable surface of an auxiliary mounting structure, such as the exterior surface of a tree trunk or the like, for example.

Generally speaking, FIGS. 1 and 2 illustrate both a first and second form of the invention used to effectively support on a horizontal plane a longitudinal scafford-type or shell-type plank member 21 whereby to effectively comprise what might be termed scaffold means such as generally designated at 22. The two upper supporting hook structures, generally designated at 23, are each of a similar type, while the two lower supporting hook structures, generally designated at 23a, are each similar to each other but different than the first-mentioned upper type of supporting hook structure 23.

It will be noted that each of the upper supporting hook structures 23 is firmly fastened to the exterior, side, engageable, surface 24 of the penetrable auxiliary mounting member generally designated at 25, and which effectively comprises a vertical wall and that each of said two upper supporting hook structures has attached thereto a longitudinal tensile member 26 which may comprise a rope, cable, wire, or the like, and which is fastened adjacent to the outer edge 27 of the plank means or member 21 at two different fastening locations as generally designated at 28, whereby to positively and firmly support said outer edge 27 of the plank member 21, while the inner or rear edge 29 of said plank means or member 21 is positively engaged and carried by the two lower supporting hook structures 23a, each of which is also firmly attached to the outer vertical side, engageable surface 24 of the penetrable auxiliary member comprising the vertical wall means 25. This provides a firmly mounted effective scaffold means 22 which can be used for overhead painting, cleaning, wallpapering, or a great variety of other purposes and which can be quickly mounted at any desired location on the wall surface 24 or on any other similar wall surface as desired or needed, and which can be just as easily quickly removed therefrom when the scaffold means 22 is no longer needed.

Also, a novel hanging type of book shelf may be provided by an arrangement of the type illustrated in FIGS. 1 and 2 which may include only a single shelf member 21 (corresponding to the scaffold plank member previously referred to) or may include a plurality of such shelf members at desired vertical locations and of desired lateral lengths and depths. This type of bookcase or set of shelves is extremely adjustable as to effective over-all size, spacing, and the like, and requires no underlying floor surface for the conventional compression type structural supporting members. In other words, such a bookcase or set of shelves can be positioned at any location on a wall spaced above underlying floor surface regions and/or wall surface regions in which other pieces of furniture or other articles are already positioned.

In the exemplary arrangement illustrated in FIGS. 1 and 2 one of the two identical upper supporting hook structures, each generally designated by the reference numeral 23, will first be described and it will be noted that it includes an interconnecting tensile shank member 31 provided at one end (the upper end 32) with a first coupling member 33 and provided at the opposite end (in the example illustrated, the lower end 34) with a second coupling member 35.

It will be noted that said first coupling member 33 is adapted to be effectively coupled with respect to an auxiliary mounting member, which, in the example illustrated, comprises the vertical wall 25 and, in particular, the outer, side, engageable surface 24 thereof. This is accomplished by reason of the nature of the structure of said first coupling member 33, which comprises an angularly downwardly and outwardly directed penetrating mounting barb member having a penetrating point 36 at the end thereof and also effectively having an impact-receiving penetration anvil means 37 angularly outwardly, downwardly and rearwardly inclined with respect to the tensile shank member 31 and in substantially transverse relationship (slightly less than perpendicular with respect to the included angle) with respect to the longitudinal direction of the penetrating barb member 33 and adapted to receive impact blows from an impact driving tool of substantial mass, such as a hammer, back end of a hatchet, or the like, for causing penetration of said penetrating mounting barb member 33 into the substantially vertical, side, engageable surface 24 of the wall member 25.

The final position attained as a result of such impacting of a hammer or the like against the impact-receiving penetration anvil means 37 is illustrated in reduced size, three-dimensional, pictorial form in FIG. 1, and is most clearly illustrated with respect to one of said supporting hook structures 23 in FIG. 2 where it will be seen that the penetrating barb member 33 has been fully driven into the supporting vertical wall 25 to a degree such that the inner vertical edge 38 of the tensile shank member 31 rests in vertical contact with the corresponding portion of the outer vertical surface 24 of the wall 25. This provides a structurally strong mounting engagement of the complete supporting hook structure 23 with respect to the vertical wall 25 and of a nature such that downward force applied thereto merely increases the firmness of the engagement therebetween rather than producing any tendency for disengagement thereof.

It will also be noted that, in said exemplary first type of supporting hook structure 23, the lower coupling member 35 is adapted to be effectively coupled with respect to an object which is to be carried, this being accomplished in the example illustrated by way of the upper looped and tied end 39 of the previously mentioned rope 26 which passes through the substantially circular ring-shaped carrying member 35, with the lower end of said rope 26 passing through a hole 41 adjacent to the previously mentioned outer edge 27 of the transverse plank member 21 and being provided with a retaining knot 42 immediately thereunder. Thus, in effect, the plank member 21 and each of the two rope members 26 may be said to effectively comprise the above-mentioned object which is to be supported by said lower coupling means or carrying member 35 of each of the upper supporting hook structures 23.

It will also be noted each of the upper supporting hook structures 23 has at the lower end thereof a second anvil means which effectively comprises an impact-receiving removal anvil means 43 which is angularly outwardly, upwardly, and rearwardly inclined with respect to the longitudinal direction (vertical in the example illustrated) of the tensile shank member 31 and is adapted to receive impact blows from an impact driving tool, such as a hammer or the like, when each of said upper supporting hook structures 23 is to be removed from mounting engagement with respect to the supporting wall 25.

Such upward impact blows against the angularly inclined lower removal anvil means 43 will cause the penetrating mounting barb member 33 to be driven out of the engaged relationship most clearly shown in FIG. 2 with respect to the mounting wall 25 and will do so in a manner such that the tensile shank member 31 moves substantially vertically along the wall surface 24 during the removal of the penetrating barb member 33 from the wall 25. This is important because, if the tensile shank member 31 does not slide along the wall surface, or very nearly so, during the removal operation as described above, then there is a tendency for such lower, upwardly directed impact blows to cause an effective pivotal movement of the complete supporting hook structure 23 around its effective pivotal attachment thereof with respect to the wall 25, which is provided by the penetrating barb means 33, and this has the effect of greatly increasing the difficulty of disengaging the mounting barb 33 from the wall 25 and also tends to cause the upper end of the tensile shank member 31 and the upper end of the penetrating barb 33 and the adjacent portion of the upper penetration anvil means 37 to dig into the adjacent surface 24 of the wall 25 and cause a considerable degree of damage thereto. Thus, the provision of the angular lower removal anvil means 43 rather than a horizontal lower anvil means is highly advantageous since it greatly facilitates the disengaging operation referred to above and minimizes any tendency toward said removal operation causing damage to the wall surface 24.

In the example illustrated, the penetrating mounting barb 33 forwardly converges toward the penetrating point 36 at the end thereof and has an angularly inclined sharpenable face portion 30 so positioned and angularly related with respect to the remainder of the penetrating point 36 as to be adaptable for sharpening by effective filing or grinding or otherwise abrading same so that the penetrating point 36 can be maintained at a high degree of sharpness at all times whereby to facilitate the easy penetration of the penetrating barb means 33 into the wall 25 or into a tree or other auxiliary supporting member which, in certain cases, may be of relatively hard wood or other material.

To further facilitate the maintenance of an extremely sharp penetrating point 36, it should be noted that, in one preferred form of the invention, the entire hook structure 23 is made of a relatively thin, substantially planar, sheet-metal material having superior strength and hardness characteristics. The fact that the entire hook structure is made from a blank of sheet metal, such as steel or the like, facilitates the manufacture thereof by stamping, forging, or various different types of low cost forming operations, and the proper degree of hardness and strength is imparted thereto by appropriately heat treating the steel. For example, and not to be construed as limiting the invention, I have found that a heat treated steel, such as No. 4130, for example, provides an ideal type of supporting hook structure both from the initial manufacturing point of view and from the point of view of the great strength and hardness produced by the heat treating thereof.

It will be noted that the two lower supporting hook structures generally designated at 23a in FIG. 1, and an exemplary one of which is clearly shown in FIG. 2 in engaged relationship and is shown in disengaged relationship in FIG. 3, is basically similar to the previously described upper supporting hook structures 23 except for the fact that the lower coupling members comprise in each case a different type of carrying member 35a from that shown at 35 in the case of the two upper supporting hook structures 23. Said different type of lower coupling member 35a will be described in detail hereinafter. The remainder of each of the two lower supporting hook structures 23a and all of the various elements thereof are similar to the two previously described upper ones generally designated at 23 and, therefore, similar parts are designated by similar reference numerals, followed by the letter, a, however.

It will be noted that the modified type of lower coupling member 35a best shown in FIGS. 2 and 3 comprises a substantially U-shaped upwardly open structure, as clearly shown at 35a, which is adapted to receive therein a correspondingly shaped longitudinal board member 44 which is firmly fastened to the bottom surface of the previously mentioned rear edge 29 of the transverse plank member 21 whereby to positively support said rear edge 29 thereof. The engagement therebetween is further enhanced by reason of the fact that each lower carrying member 35a is additionally provided with supplementary locking means for effective locking cooperation with respect to the carried object. As illustrated, said supplementary locking means comprises an aperture 45 and a nail 46 adapted to be driven through the aperture 45 and into the lower board member 44 fastened to the bottom surface of the rear edge of the longitudinal horizontal plank member 21, thus positively locking said plank member 21 with respect to said two lower supporting hook structures 23a as is best shown at the bottom of FIG. 2. However, it should be clearly noted that the elements 45 and 46 may be modified to comprise threaded locking means, various other types of locking means, or, in certain cases, may be eliminated entirely, if desired.

FIGS. 4 and 5 illustrate a further modification of the type of supporting hook structure shown at 23 in FIGS. 1 and 2 and, therefore, corresponding parts are designated by the same reference numerals, followed by the letter, b, however. In this modification, it will be understood that each of the supporting hook structures 23b is adapted to be mounted with respect to the wall surface 24b in precisely the same manner as the corresponding supporting hook structures 23 of FIGS. 1 and 2.

Also, it will be understood that the various structural elements of the form shown in FIGS. 4 and 5 are essentially the same as those of the corresponding supporting hook structures 23 shown in FIGS. 1 and 2. However, it will be noted that the carrying member 35b, comprising the lower coupling means, is provided with one exemplary type of a novel type of friction-minimizing means, generally designated at 47 in FIG. 5, and which comprises a ball bearing insert means adapted to be rotatively mounted within the hole 48 defined within the ring-shaped carrying member 35b and adapted to rotatably mount and receive therein a horizontal rod or tube member, such as is designated at 49. Incidentally, it should be noted that, as shown in FIG. 4, a single longitudinal rod or tube member 49 is shown as mounted in each of the friction-minimizing bearing insert means 47. However, the invention is not specifically so limited, and individual members corresponding to shortened forms of the rod member 49 may be individually mounted in the corresponding bearing insert means 47. Furthermore, one or more such supporting hook structures 23b may be so employed rather than the two shown in FIG. 4 for illustrative purposes.

Incidentally, it should be noted that insert means 47 may be modified substantially from the showing of FIG. 5 and may comprise an insulated mount or the like or any other suitable mount for an electrical conduit, if desired, in lieu of the specific ball bearing means illustrated in FIG. 5. All such arrangements are intended to be comprehended by the showing of FIG. 4 which is not specifically limited to the ball bearing type of insert means shown at 47 in FIG. 5.

FIG. 5A illustrates a very slight modfiication of the friction-minimizing ball bearing insert member 47 of FIG. 5 which is designated at 47' in FIG. 5A and which, it will be noted, is modified as to structure in a manner whereby to be capable of cooperation with a through-passing ropes such as that shown fragmentarily at 57 whereby to effectively provide a pulley or the like for hoisting purposes which will be capable of carrying great loads without binding. Otherwise, this modification is substantially the same as that shown in FIG. 5, and similar parts are designated by the same reference characters, primed, however.

FIGS. 6 and 7 illustrate a further modification of the upper form of supporting hook structure shown at 23 in FIGS. 1 and 2 and shown at 23b in FIGS. 4 and 5 and, therefore, corresponding parts are designated by similar reference numerals, followed by the letter, c, however. In this modification, it will be noted that the only major difference from the form shown in FIG. 5 is that there is no ball bearing insert means corresponding to that shown at 47 in FIG. 5. Instead, a pipe or conduit member 49c, and generally corresponding to the rod or tube 49 of FIGS. 4 and 5, is adapted to be mounted within the hole 48c of the carrying member 35c and to be effectively locked in place therein by a locking means 46c comprising a threaded screw member threadedly engaging the threaded hole 45c in the carrying member 35c and having an enlarged finger-engageable head 51 to facilitate tightening the threaded locking screw 46c against the exterior of the pipe or conduit 49c, whereby to positively lock in place until it is desired that it be moved therefrom.

FIG. 8 is a view very similar to FIG. 5 and also to FIG. 6, and illustrates a further very slight modification of the form of the invention comprising the upper supporting hook structures 23 of the form of the invention shown in FIGS. 1 and 2, and the modifications thereof shown at 23b in FIGS. 4 and 5, and at 23c in FIGS. 6 and 7. Therefore, corresponding parts are designated by corresponding reference numerals, followed by the letter, d, however. It will be noted that, in this modification of the invention, the upper portion of the ring-shaped carrying member 35d is removed or open as designated at 52 and, thus, facilitates the vertical entry downwardly into the interior thereof (and the subsequent removal therefrom when desired) of an object which is to be supported and which corresponds to the rod or tube 49 of FIGS. 4 and 5 or the pipe member 49c of FIG. 6. In the case of the showing of FIG. 8, it is particularly adapted to receive through the opening 52 a bail or handle member, such as conventionally provided at the top of a bucket or other similar container. However, it should be clearly understood that the invention is not specifically limited to such an arrangement only, but is adapted for cooperation with any type of object which is to be carried and which is capable of being placed within the modified upwardly open ring-shaped carrying member 35d.

FIGS. 9 and 10 illustrate a slight modification of the form of the invention shown in FIG. 8 and, therefore, corresponding parts are designated by corresponding reference numerals, followed by the letter, e, however. In this very slight modification, it will be noted that the upwardly open ring-shaped carrying member 35e is provided with friction-minimizing means 47e which effectively comprises pulley means taking the form of a rotatable outer pulley sheave member 53 rotatably mounted on a center pivot pin or shaft member 54 which has a threaded inner end 55 engaging the tensile shank member 31e and which has a headed outer end 56 abutting the outer side of the carrying member 35e and passing through the aperture 45e therein.

The arrangement is such that the pulley sheave member 53 is freely rotatively mounted and, indeed, may be made of low-friction "nylon," "Teflon," or may be provided with appropriate inner friction-minimizing bearing means, if desired, whereby to minimize the friction encountered by a rope 57e passing thereover when the entire device is used as a pulley or hoisting device or the like. This is primarily for use where it is desired to provide an absolute minimum of friction. However, it should be clearly noted that, normally, if the inside edges of the hole 48 of FIG. 5, 48c of FIGS. 6 and 7, 48d of FIG. 8, or 48e of FIGS. 9 and 10, are slightly rounded in the manner best shown in FIG. 10, and if the rope 57e is of a type which inherently has a minimum of friction, such as a "nylon" rope or the like, it will normally be found that the amount of friction provided by an effective pulley-hoisting arrangement where direct contact between the "nylon rope" 57e and the rounded inside edge 48e of the hole will not be excessive and will be permissible for most such hoisting arrangements. However, where this amount of friction is too great, then the arrangement of FIGS. 9 and 10 having the friction-minimizing pulley means 47e may be employed, and this, of course, reduces the friction to a much greater extent.

FIG. 11 is a view quite similar to FIGS. 6, 8 or 9, and merely illustrates a further slight modification of the type of supporting hook structure. Therefore, corresponding parts are designated by corresponding reference numerals, followed by the letter, f, however. In this modification, it will be noted that the lower carrying member 35f is effectively interconnected with respect to the upper end 32f of the tensile shank member 31f by an extra, angularly directed, auxiliary tension member 58, thus providing extra support for the carrying member 35f, making it possible to carry a maximum load therein.

FIG. 12 illustrates a further modification of the supporting hook structure of the present invention and, because of the similarity to the earlier forms illustrated and described, corresponding parts are designated by corresponding reference numerals, followed by the letter, g, however. In this modification, it will be noted that the lower carrying member 35g actually comprises an outwardly directed lip or edge member having a horizontal top edge 59 which may directly carry supported thereon any type of horizontal member, such as a shelf member or the like in the manner of the shelf or platform member 21 of the form of the invention shown in FIGS. 1 and 2, or which may have an auxiliary flat supporting panel member 61 affixed to the edge 59 whereby to provide a relatively large area upper contact surface 62 for supporting such a shelf or platform. In the event that the panel member 61 is metal, it may be welded, brazed, or soldered to the edge 59 and, in the event that it is made of some other material, it may be cemented with epoxy resin glue or various other adhesive fastening means well known in the art.

FIG. 13 is a view illustrating a further modification and, because of the similarities to the earlier forms, corresponding parts are designated by corresponding reference numerals, followed by the letter "h," however. In this modification, it will be noted that the carrying member 35h is of substantially the same form as that shown at 35g in FIG. 12. However, it has fastened thereto an additional member 61h which comprises a tubular socket member which is welded, brazed, soldered, or otherwise suitably affixed to the horizontal edge 59h and the outer edge of the tensile shank member 31h whereby to provide a socket adapted to receive a rod, tube, or pole therein, such as the base of a flagpole, for example, although not specifically so limited.

FIG. 14 is a view of a modification of the tensile shank member portion of any of the various forms of the invention as they would appear viewed substantially in the direction of the cross-sectional line arrows 14—14 of FIG. 3, with the addition to the tensile shaft member 31j of a stabilizing member 63, which is welded or otherwise suitably affixed to the inner edge 38j of the tensile shank member 31j for contact with a flat wall surface similar to that shown fragmentarily at 24j whereby to laterally stabilize the entire device. It will be noted that, in this view, portions similar to the earlier forms of the invention are designated by similar reference numerals, followed by the letter "j," however. Furthermore, it should be noted that this type of stabilizing means 63 may be applied to any of the various forms of the invention.

FIG. 15 is a view very similar to FIG. 14, and corresponding parts are designated by similar reference numerals, followed by the letter "k," however. In this modification, the only difference from the form of the invention illustrated in FIG. 14 is the fact that the stabilizing means 63k is no longer flat and adapted for contact with a flat horizontal surface such as shown at 24j in FIG. 14 but, instead, is curved and adapted for contact with a curved surface 24k as shown in FIG. 15 which, for example, might comprise a portion of a tree trunk or any other similar curved surface.

It should be noted that the penetrating barb members, such as shown at 33 in the first form of the invention, for example, may be modified as to length and shape, depending upon the circumstances of use—that is, the kind of auxiliary supporting member into which it is to be driven and the extent of the load which is to be carried, etc., and the various other significant factors.

Also, it should be noted that, in the various forms of the invention wherein the lower carrying member is upwardly open, such as shown at 35a in FIGS. 2 and 3, or in any of the other forms of the invention having upwardly open lower carrying members, an additional connection or securing member, such as a chain or other functionally equivalent member or the like, may be adapted to be fastened over the upward opening thereof after a supported object has been placed therein, if desired.

It should also be noted that a pair of supporting hook structures of the general type seen in FIG. 8, may be placed in relatively laterally positionally reversed overlapped relationship such that the two carrying members 35d overlap each other in opposite directions and such that the two penetrating barb members 33d have their penetrating points 36e laterally spaced apart and facing each other for supported cooperation over some horizontally directed auxiliary supporting member, such as the branch of a tree or the like. This would allow the handle or bail member of a container to be carried in the overlapped lower carrying members 35d.

It should also be noted that, in certain instances a supporting structure, such as the one shown at 23d in FIG. 8, may be inverted and the uppermost carrying member 35d may be passed over a rod or other transverse projection or hook member while the lowermost penetrating barb portion 33d may be allowed to hang therebelow for engagement with the handle or bail member of a container such as a bucket, food-cooking pan, or the like. This arrangement might be particularly advantageous for holding a cooking vessel over an open fire on an upper transverse supporting framework or rod structure.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A supporting hook structure adapted to be driven into mounted relationship with respect to a penetrable auxiliary mounting member and to be driven out of engagement therewith when desired, comprising: an interconnecting tensile shank member having an upper end provided with a first coupling member and having a lower end provided with a second coupling member, said upper first coupling member being adapted to be effectively coupled with respect to a penetrable auxiliary mounting member in a manner effectively supported thereby and said lower second coupling member being adapted to be effectively coupled with respect to an object which is to be carried in effective supporting and carrying relationship with respect thereto, said upper first coupling member comprising an angularly downwardly and outwardly directed penetrating mounting barb member having a forwardly converging penetrating point at the end thereof and defining an included angle of less than 45 degrees with respect to said interconnecting tensile shank member, said upper end of said tensile shank member and the effective rear end of said barb member being effectively provided with an impact-receiving penetration anvil means angularly outwardly and downwardly inclined with respect to said tensile shank member and in substantially transverse relationship to the longitudinal direction of said barb member and adapted to receive impact blows from a driving tool of substantial mass for causing penetration of said barb member into said penetrable auxiliary mounting member, said lower end of said tensile shank member being effectively provided with an impact-receiving removal anvil means angularly outwardly and upwardly inclined with respect to said tensile shank member and adapted to receive impact blows from a driving tool of substantial mass for causing ejection and removal of said barb member from said auxiliary mounting member while moving substantially along a side surface thereof.

2. A supporting hook structure as defined in claim 1, wherein said lower second coupling member comprises an outwardly projecting carrying member adapted to be effectively formed for carrying relationship with respect to an object which is to be carried.

3. A supporting hook structure as defined in claim 1, wherein said lower second coupling member comprises an outwardly projecting carrying member adapted to be effectively formed for carrying relationship with respect to an object which is to be carried, said carrying member being provided with locking means for effective locking cooperation with respect to an object which is to be carried.

4. A supporting hook structure as defined in claim 1, wherein said lower second coupling member comprises an outwardly projecting carrying member adapted to be effectively formed for carrying relationship with respect to an object which is to be carried, said carrying member being provided with threaded screw-type locking means for effective locking cooperation with respect to an object which is to be carried.

5. A supporting hook structure as defined in claim 1, wherein said lower second coupling member comprises an outwardly projecting carrying member adapted to be effectively formed for carrying relationship with respect to an object which is to be carried, said carrying member being provided with friction-minimizing means.

6. A supporting hook structure as defined in claim 1, wherein said lower second coupling member comprises an outwardly projecting carrying member adapted to be effectively formed for carrying relationship with respect to an object which is to be carried, said carrying member being provided with friction-minimizing pulley means.

7. A supporting hook structure as defined in claim 1, wherein said supporting hook structure is of integral construction of substantially flat planar high strength, heat-treated metallic sheet material.

8. A supporting hook structure as defined in claim 1, wherein said tensile shank member is provided with a laterally enlarged stabilizing member adapted to abuttingly and stabilizingly contact said side surface of said auxiliary mounting member for stabilizing said supporting hook structure against lateral wobble about its vertical contact plane with said side surface of said auxiliary mounting member.

9. A supporting hook structure as defined in claim 1, wherein said lower second coupling member comprises a substantially ring shaped carrying member adapted to be effectively formed for carrying relationship with respect to an object which is to be carried.

10. A supporting hook structure as defined in claim 1, wherein said lower second coupling member comprises an upwardly open substantially hook shaped carrying member adapted to be effectively formed for carrying relationship with respect to an object which is to be carried.

11. A supporting hook structure as defined in claim 1, wherein said lower second coupling member comprises a substantially U-shaped upwardly open carrying member adapted to receive, in effectively carried relationship, an object which is to be carried.

12. A supporting hook structure as defined in claim 1, wherein said lower second coupling member comprises a substantially upwardly directed tubular receiving socket-type carrying member adapted to receive, in effectively carried relationship, an object which is to be carried.

13. A supporting hook structure as defined in claim 1, wherein said lower second coupling member comprises an outwardly projecting carrying member provided with a substantially horizontal top supporting surface adapted to receive thereon, in effectively carried relationship, an object which is to be carried.

14. A supporting hook structure as defined in claim 1, wherein said included angle defined by said angularly downwardly and outwardly directed penetrating mounting barb member and said interconnecting tensile shank member is less than 35 degrees.

15. A supporting hook structure as defined in claim 1, wherein said impact-receiving removal anvil means defines an included angle of less than 70 degrees with respect to said interconnecting tensile shank member.

16. A supporting hook structure as defined in claim 1, wherein said tensile shank member has an inner edge adapted to firmly engage and supportedly rest against an outer surface of a penetrable auxiliary mounting member and has a substantially parallel outer edge outwardly spaced therefrom, said impact-receiving penetration anvil means extending in said angularly outwardly and downwardly inclined relationship with respect to said interconnecting tensile shank member between said inner and outer edges of said tensile shank member and lying entirely inwardly of said outer edge of said shank member.

(References on following page)

References Cited by the Examiner
UNITED STATES PATENTS

| | | | |
|---|---|---|---|
| 98,130 | 12/1869 | Walton | 248—55 |
| 294,385 | 3/1884 | Hemmenway | 248—267 |
| 440,899 | 11/1890 | Peden | 248—267 |
| 527,763 | 10/1894 | Berg | 248—227 |
| 595,218 | 12/1897 | Stauffer | 248—43 |
| 708,736 | 9/1902 | Renner | 248—267 |
| 724,041 | 3/1903 | Renner | 248—267 |
| 850,662 | 4/1907 | Lorenz | 248—235 |
| 876,411 | 1/1908 | Tatum | 248—267 |
| 967,383 | 8/1910 | Hunter | 248—222 |
| 1,018,899 | 2/1912 | Going | 248—235 |
| 1,120,494 | 12/1914 | Hoenisch | 248—267 |
| 1,185,587 | 5/1916 | Bragg et al. | 248—217 |
| 1,291,079 | 1/1919 | Morris | 248—55 |
| 1,571,581 | 2/1926 | Fliegelman et al. | 248—43 |
| 1,750,694 | 3/1930 | St. John | 248—71 |
| 1,790,610 | 1/1931 | Vindal | 248—74 X |
| 1,883,508 | 10/1932 | Bonday | 248—43 |
| 2,195,579 | 4/1946 | Murdock | 248—242 |
| 2,661,918 | 12/1953 | Riggs | 248—43 |
| 2,841,353 | 7/1958 | Burdick | 248—224 |
| 3,168,200 | 2/1965 | Larson | 241—177 |

FOREIGN PATENTS

| | | |
|---|---|---|
| 710,030 | 6/1954 | Great Britain. |
| 82,905 | 3/1935 | Sweden. |
| 181,995 | 1/1936 | Switzerland. |

CLAUDE A. LE ROY, *Primary Examiner.*